United States Patent
Morita et al.

(10) Patent No.: US 9,090,754 B2
(45) Date of Patent: Jul. 28, 2015

(54) METHOD FOR PRODUCING DENATURED CONJUGATED DIENE POLYMER

(75) Inventors: Hiroyuki Morita, Tokyo (JP); Takeshi Yuasa, Tokyo (JP); Koichiro Tani, Tokyo (JP); Naoya Nosaka, Tokyo (JP); Ryouji Tanaka, Tokyo (JP)

(73) Assignee: JSR CORPORATION, Tokyo (JP)

( * ) Notice: Subject to any disclaimer, the term of this patent is extended or adjusted under 35 U.S.C. 154(b) by 0 days.

(21) Appl. No.: 14/342,071

(22) PCT Filed: Aug. 29, 2012

(86) PCT No.: PCT/JP2012/071873
§ 371 (c)(1),
(2), (4) Date: Feb. 28, 2014

(87) PCT Pub. No.: WO2013/031850
PCT Pub. Date: Mar. 7, 2013

(65) Prior Publication Data
US 2014/0221563 A1 Aug. 7, 2014

(30) Foreign Application Priority Data
Aug. 31, 2011 (JP) ................................. 2011-189438

(51) Int. Cl.
| | |
|---|---|
| C08L 9/00 | (2006.01) |
| C08L 15/00 | (2006.01) |
| C08F 8/30 | (2006.01) |
| C08C 19/00 | (2006.01) |
| C08K 3/04 | (2006.01) |
| B60C 1/00 | (2006.01) |
| C08C 19/44 | (2006.01) |
| C08F 236/10 | (2006.01) |
| C08K 3/00 | (2006.01) |
| C08K 3/36 | (2006.01) |

(52) U.S. Cl.
CPC ................. *C08K 3/04* (2013.01); *B60C 1/0016* (2013.04); *B60C 1/0025* (2013.04); *C08C 19/44* (2013.01); *C08F 236/10* (2013.01); *C08K 3/0033* (2013.01); *C08K 3/36* (2013.01); *Y02T 10/862* (2013.01)

(58) Field of Classification Search
CPC ............. C08L 9/00; C08L 15/00; C08F 8/30; C08F 8/42
USPC ........ 525/342, 331.9, 374; 524/571, 495, 492
See application file for complete search history.

(56) References Cited

U.S. PATENT DOCUMENTS

| | | | | |
|---|---|---|---|---|
| 6,943,250 | B2 * | 9/2005 | Brockmann | 544/229 |
| 8,106,130 | B2 * | 1/2012 | Fukuoka et al. | 525/332.9 |
| 8,809,440 | B2 * | 8/2014 | Tanaka et al. | 524/495 |
| 8,962,745 | B2 * | 2/2015 | Hogan et al. | 524/575 |
| 2004/0254301 | A1 * | 12/2004 | Tsukimawashi et al. | 525/271 |
| 2005/0020757 | A1 | 1/2005 | Ozawa et al. | |
| 2005/0203251 | A1 | 9/2005 | Oshima et al. | |
| 2008/0015309 | A1 | 1/2008 | Ozawa et al. | |
| 2009/0036567 | A1 | 2/2009 | Oshima et al. | |
| 2011/0009583 | A1 * | 1/2011 | Yan et al. | 526/204 |
| 2011/0112212 | A1 * | 5/2011 | Kimura et al. | 523/156 |
| 2011/0146877 | A1 * | 6/2011 | Tanaka et al. | 152/547 |
| 2011/0172344 | A1 * | 7/2011 | Yoshida et al. | 524/493 |
| 2011/0319519 | A1 * | 12/2011 | Sone et al. | 523/155 |
| 2012/0270997 | A1 * | 10/2012 | Tanaka et al. | 524/572 |
| 2013/0296481 | A1 | 11/2013 | Tanaka | |

FOREIGN PATENT DOCUMENTS

| | | |
|---|---|---|
| EP | 1 449 857 A1 | 8/2004 |
| JP | 2004 18795 | 1/2004 |
| JP | 2004 67987 | 3/2004 |

(Continued)

OTHER PUBLICATIONS

U.S Appl. No. 14/367,533, filed Jun. 20, 2014, Morita, et al.
U.S. Appl. No. 14/342,200, filed Feb. 28, 2014, Morita, et al.
International Search Report Issued Nov. 6, 2012 in PCT/JP12/71873 Filed Aug. 29, 2012.
European Search Report issued Apr. 10, 2015 in corresponding European Patent Application No. 12827478.
Chinese Office Action issued on Feb. 4, 2015 in corresponding Chinese Patent Application No. 201280023921.9 w/English translation.

*Primary Examiner* — Rip A Lee
(74) *Attorney, Agent, or Firm* — Oblon, McClelland, Maier & Neustadt, L.L.P.

(57) ABSTRACT

A method for producing a modified conjugated diene polymer usable as a raw material of a crosslinked polymer which is used for use in tires and the like of automobiles and can enhance low fuel consumption performance of automobiles and the like is provided.

A method for producing a modified conjugated diene polymer comprising a polymerization step in which a monomer including a conjugated diene compound or a monomer including a conjugated diene compound and an aromatic vinyl compound is polymerized in the presence of at least one compound selected from the group consisting of the following formulae (1) and (2) and an alkali metal compound or an alkaline earth metal compound to obtain a modified conjugated diene polymer.

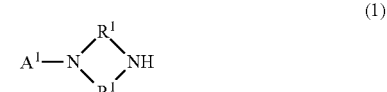

(1)

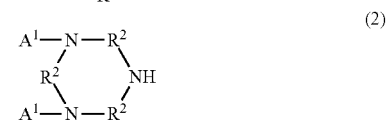

(2)

(In the formulae, $A^1$ is a hydrocarbylsilyl group in which three H's (hydrogen atoms) in a "—$SiH_3$" structure are each substituted by a hydrocarbyl group, and $R^1$ and $R^2$ are hydrocarbylene groups.)

12 Claims, No Drawings

(56) References Cited

FOREIGN PATENT DOCUMENTS

| | | | | |
|---|---|---|---|---|
| JP | 2005 290355 | 10/2005 | | |
| JP | 2011-57946 | 3/2011 | | |
| JP | 2011 68828 | 4/2011 | | |
| JP | 2011-68828 A * | 4/2011 | .............. | C08C 19/25 |
| JP | 2011 102347 | 5/2011 | | |
| JP | 2011 219699 | 11/2011 | | |
| WO | 03 048216 | 6/2003 | | |
| WO | WO 2008/013090 A1 * | 1/2008 | ................ | C08F 8/42 |
| WO | 2009 117329 | 9/2009 | | |
| WO | 2010 044252 | 4/2010 | | |
| WO | 2010 104149 | 9/2010 | | |
| WO | WO 2010/104149 * | 9/2010 | ............. | C08L 15/00 |
| WO | 2011 049180 | 4/2011 | | |
| WO | WO 2011/049180 A1 * | 4/2011 | .............. | C08C 19/25 |
| WO | 2012 096300 | 7/2012 | | |

\* cited by examiner

METHOD FOR PRODUCING DENATURED CONJUGATED DIENE POLYMER

TECHNICAL FIELD

The present invention relates to a method for producing a modified conjugated diene polymer.

BACKGROUND ART

As rubbers for automobile tires, there have been known conjugated diene rubbers (for example, styrene-butadiene copolymers) obtained by emulsion polymerization methods. In recent years, it has been expected to improve low fuel consumption performance of automobiles, and various conjugated diene rubbers capable of realizing excellent low fuel consumption performance have been proposed.

As an example, there has been proposed a conjugated diolefin (co)polymerized rubber characterized in (1) being a (co)polymer rubber of a conjugated diolefin or a conjugated diolefin and an aromatic vinyl compound, (2) having a primary amino group and an alkoxysilyl group which are bound to a (co)polymer chain, and (3) that a bifunctional or more monomers are copolymerized in the (co)polymer chain, and/or that at least a part of the (co)polymer chain is coupled with a bifunctional or more coupling agent (Patent Document 1).

As another example, there has been proposed a modified diene polymer rubber obtained from a step 1 of polymerizing a conjugated diene monomer or a conjugated diene monomer and an aromatic vinyl monomer in a hydrocarbon solvent in the presence of an alkali metal catalyst to obtain an active polymer having an alkali metal end, and a step 2 of reacting the active polymer with a compound represented by a specific formula to obtain a modified polymer rubber (Patent Document 2).

Further, as a method for producing a modified polymer capable of promoting interactions with silica and carbon black and improving fracture characteristics, wear resistance and low exothermic properties, there has been proposed a method of performing a primary modification reaction in which a hydrocarbyloxysilane compound is reacted with a polymer having organometallic active sites in its molecule, at the active sites, and then performing a secondary modification reaction in which the hydrocarbyloxysilane compound is reacted through a condensation reaction of hydrocarbyloxysilyl groups with each other (Patent Document 3).

PRIOR-ART DOCUMENTS

Patent Documents

Patent Document 1: JP-A-2004-18795
Patent Document 2: JP-A-2005-290355
Patent Document 3: WO 03/048216 A1

SUMMARY OF THE INVENTION

Problems that the Invention is to Solve

As described above, there have been proposed various conjugated diene rubbers capable of realizing excellent low fuel consumption performance of automobiles. However, under financial circumstances such as a price increase of gasoline and environmental circumstances such as global warming caused by carbon dioxide emissions, it has been expected to realize further low fuel consumption of automobiles. Then, an object of the present invention is to provide a method for producing a modified conjugated diene polymer or the like usable as a raw material of a crosslinked polymer which can be used for use in automobile tires (particularly treads) and the like and can enhance low fuel consumption performance of automobiles and the like.

Means for Solving the Problems

In order to solve the above-mentioned problems, the present inventors have made intensive studies. As a result, it has been found that when a modified conjugated diene polymer is obtained using a specific compound, and then, a crosslinked polymer is produced using this modified conjugated diene polymer as a raw material, this crosslinked polymer is excellent in physical properties such as low hysteresis loss characteristics (70° C. tan δ), wet skid resistance (0° C. tan δ) and wear resistance and can provide excellent low fuel consumption performance in use such as automobile tires, to accomplish the present invention.

Namely, the present invention provides the following [1] to [8].

[1] A method for producing a modified conjugated diene polymer comprising a polymerization step in which a monomer including a conjugated diene compound or a monomer including a conjugated diene compound and an aromatic vinyl compound is polymerized in the presence of at least one compound selected from the group consisting of the following formulae (1) and (2) and an alkali metal compound or an alkaline earth metal compound to obtain a modified conjugated diene polymer.

(1)

(2)

(In the formulae (1) and (2), $A^1$ is a hydrocarbylsilyl group in which three H's (hydrogen atoms) in a "—$SiH_3$" structure are each substituted by a hydrocarbyl group. $R^1$ and $R^2$ are hydrocarbylene groups. In the formulae, $A^1$, $R^1$ and $R^2$ which are each present in plurality may each be same or different.)

[2] The method for producing a modified conjugated diene polymer according to [1], comprising a modification step in which a compound represented by the following formula (3) is added to and reacted with the modified conjugated diene polymer obtained in the polymerization step to obtain a modified conjugated diene polymer having a structure represented by the following formula (6):

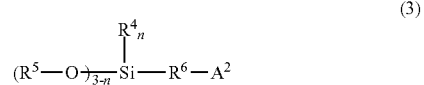

(3)

(In the formula (3), $A^2$ is a functional group having at least one atom selected from the group consisting of N, P and S, having no active hydrogen and is bound to $R^6$ by any one atom of the above N, P and S. In a part or all of the at least one atom selected from the group consisting of the above N, P and S of $A^2$, three H's (hydrogen atoms) in a "—$SiH_3$" structure may each be protected by a hydrocarbylsilyl group substituted by a hydrocarbyl group. $R^4$ and $R^5$ are hydrocarbyl groups. $R^6$ is a hydrocarbylene group. n is an integer of 0 to 2. In the formula, $R^4$ and $R^5$ which are each present in plurality may each be same or different.)

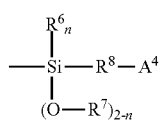

(In the formula (6), $A^4$ is a functional group having at least one atom selected from the group consisting of N, P and S and bound to $R^8$ by any one atom of the above N, P and S. A part or all of the at least one atom selected from the group consisting of the above N, P and S of $A^4$ may be protected by a hydrocarbylsilyl group. $R^6$ is a hydrocarbyl group. $R^7$ is a hydrogen atom or a hydrocarbyl group. n is an integer of 0 to 2. $R^8$ is a hydrocarbylene group. In the formula, $R^6$ and $R^7$ which are each present in plurality may each be same or different.)

[3] The method for producing a modified conjugated diene polymer according to [1] or [2], wherein the modified conjugated diene polymer is reacted with an onium-forming agent.

[4] A modified conjugated diene polymer having at least one structure selected from the group represented by the following formulae (4) and (5) and a structure represented by the following formula (6):

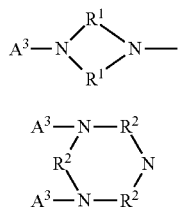

(In the formulae (4) and (5), $A^3$ is a hydrogen atom or a hydrocarbylsilyl group. $R^1$ and $R^2$ are hydrocarbylene groups. In the formula (5), $A^3$ present in plurality may each be same or different.)

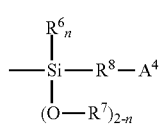

(In the formula (6), $A^4$ is a functional group having at least one atom selected from the group consisting of N, P and S and bound to $R^8$ by any one atom of the above N, P and S. A part or all of the at least one atom selected from the group consisting of the above N, P and S of $A^4$ may be protected by a hydrocarbylsilyl group. $R^6$ is a hydrocarbyl group. $R^7$ is a hydrogen atom or a hydrocarbyl group. n is an integer of 0 to 2. $R^8$ is a hydrocarbylene group. In the formula, $R^6$ and $R^7$ which are each present in plurality may each be same or different.)

[5] A modified conjugated diene polymer having at least one structure selected from the group represented by the following formulae (4) and (5) and a structure represented by the following formula (7):

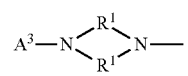

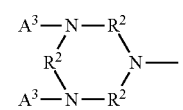

(In the formulae (4) and (5), $A^3$ is a hydrogen atom or a hydrocarbylsilyl group. $R^1$ and $R^2$ are hydrocarbylene groups. In the formula (5), $A^3$ present in plurality may each be same or different.)

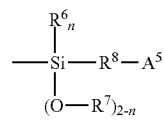

(In the formula (7), $A^5$ is a group in which a functional group having at least one atom selected from the group consisting of N, P and S and bound to $R^8$ by any one atom of the above N, P and S is converted into an onium. A part or all of the at least one atom selected from the group consisting of the above N, P and S of $A^5$ may be protected by a hydrocarbylsilyl group. $R^6$ is a hydrocarbyl group. $R^7$ is a hydrogen atom or a hydrocarbyl group. n is an integer of 0 to 2. $R^8$ is a hydrocarbylene group. In the formula, $R^6$ and $R^7$ which are each present in plurality may each be same or different.)

[6] A polymer composition comprising the modified conjugated diene polymer according to [4] or [5], carbon black and/or silica and a crosslinking agent.

[7] A crosslinked polymer obtained by crosslinking the polymer composition according to [6].

[8] A tire in which at least the crosslinked polymer according to [7] is used as a material of a tread or a side wall.

Effect of the Invention

A crosslinked polymer of the present invention is excellent in low hysteresis loss characteristics (70° C. tan δ), wet skid resistance (0° C. tan δ), wear resistance and the like.

The crosslinked polymer of the present invention can provide excellent low fuel consumption performance when used as a material for automobile tires (particularly treads) and the like.

Mode For Carrying Out The Invention

[Method for Producing Modified Conjugated Diene Polymer]

A method for producing a modified conjugated diene polymer of the present invention comprises a polymerization step in which at least a monomer including a conjugated diene compound or a monomer including a conjugated diene compound and an aromatic vinyl compound is polymerized in the presence of at least one compound selected from the group consisting of the following formulae (1) and (2) and an alkali metal compound or an alkaline earth metal compound to obtain a modified conjugated diene polymer.

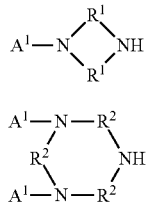

(In the formulae (1) and (2), $A^1$ is a hydrocarbylsilyl group in which three H's (hydrogen atoms) in a "—$SiH_3$" structure are each substituted by a hydrocarbyl group. $R^1$ and $R^2$ are hydrocarbylene groups. In the formulae, $A^1$, $R^1$ and $R^2$ which are each present in plurality may each be same or different.

The hydrocarbylene groups in the formulae (1) and (2) include, for example, a methylene group, alkylene groups, arylene groups, aralkylene groups and the like. Although it is not particularly limited, the carbon number of the hydrocarbylene group is, for example, from 1 to 10.

The hydrocarbyl groups contained in the hydrocarbylsilyl groups in the formulae (1) and (2) include, for example, alkyl groups, aryl groups, aralkyl groups and the like. Although it is not particularly limited, the carbon number of the hydrocarbyl group is, for example, from 1 to 10.

Examples of the compounds of the above-mentioned formula (1) include, for example, compounds represented by the following formulae (10) and (11):

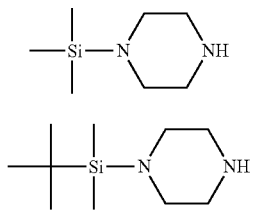

The compound represented by the above-mentioned formula (10) is specifically N-trimethylsilylpiperazine. The compound Represented by the above-mentioned formula (11) is specifically N-(tert-butyldimethylsilyl)piperazine.

Examples of the compounds of the above-mentioned formula (2) include, for example, compounds represented by the following formula (12):

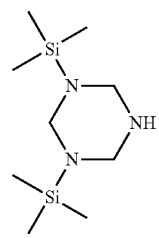

The compound represented by the above-mentioned formula (12) is specifically 1,3-ditrimethylsilyl-1,3,5-triazinane.

The above-mentioned modified conjugated diene polymer can be obtained, for example, by supplying at least one compound selected from the group consisting of the formulae (1) and (2) and an alkali metal compound or an alkaline earth metal compound (for example, a lithium compound such as an alkyllithium), respectively, into a polymerization solution containing a monomer, a solvent and the like, and mixing these compounds. Further, the at least one compound selected from the group consisting of the above-mentioned formulae (1) and (2) and the alkali metal compound or the alkaline earth metal compound (for example, a lithium compound such as an alkyllithium) may be previously mixed before being supplied into the polymerization solution. Namely, the above-mentioned modified conjugated diene polymer can be prepared by adding the specific secondary amine and lithium compound in the polymerization system (in-situ), or can be added into the polymerization system, as one previously prepared from the specific secondary amine and lithium compound.

In the present invention, the amount used of the at least one compound selected from the group consisting of the formulae (1) and (2) is preferably from 0.2 to 20 mmol per 100 g of the monomer.

Alkali metals in the alkali metal compounds include lithium, sodium, potassium and the like.

Alkaline earth metals in the alkaline earth metal compounds include calcium, magnesium and the like.

Above all, particularly preferred is lithium. In this specification, description will be made below, taking lithium as an example. In this connection, in the following description, an embodiment of using another alkali metal or alkaline earth metal in place of lithium is also possible.

The alkyllithiums as the alkali metal compounds usable in the present invention include, for example, alkyllithiums having 1 to 4 carbon atoms.

Examples of the alkyllithiums having 1 to 4 carbon atoms include methyllithium, ethyllithium, n-propyllithium, iso-propyllithium, n-butyllithium, sec-butyllithium, tert-butyllithium and the like.

The mixing molar ratio of the at least one compound selected from the group consisting of the above-mentioned formulae (1) and (2) and the alkali metal compound or the alkaline earth metal compound (the alkali metal compound or the alkaline earth metal compound/the at least one compound selected from the group consisting of the formulae (1) and (2)) is preferably from 0.1 to 1.8, more preferably from 0.8 to 1.6, and particularly preferably from 1.0 to 1.4. When the mixing molar ratio exceeds 1.8, the Mooney viscosity is increased, sometimes resulting in a difficulty of blending. When the mixing molar ratio is less than 0.1, the Mooney viscosity is decreased to sometimes decrease the strength of the crosslinked polymer.

Examples of the conjugated diene compounds (conjugated diene monomers) used in the present invention include 1,3-butadiene, isoprene, 2,3-dimethyl-1,3-butadiene, 1,3-pentadiene, 1,3-hexadiene, 1,3-heptadiene, 2,3-dimethylbutadiene, 2-phenyl-1,3-butadiene, 3-methyl-1,3-pentadiene, 2-chloro-1,3-butadiene and the like. Above all, preferred are 1,3-butadiene, isoprene, 2,3-dimethyl-1,3-butadiene and the like.

These compounds may be used either alone or as a combination of two or more thereof.

From the viewpoint that it is possible to obtain the modified conjugated diene polymers having active lithium ends, all these conjugated diene compounds have a similar function, and in the present invention, it is possible to use even one not described in examples described later.

Examples of the aromatic vinyl compounds (aromatic vinyl-based monomers) used in the present invention include styrene, 2-methylstyrene, 3-methylstyrene, 4-methylstyrene, α-methylstyrene, 2,4-dimethylstyrene, 2,4-diisopropylstyrene, 4-tert-butylstyrene, 5-t-butyl-2-methylstyrene, vinylethylbenzene, divinylbenzene, trivinylbenzene, divinylnaphthalene, tert-butoxystyrene, vinylbenzyldimethylamine, (4-vinyl-benzyl)dimethylaminoethyl ether, N,N-dimethylaminoethylstyrene, N,N-dimethylaminomethylstyrene, 2-ethylstyrene, 3-ethylstyrene, 4-ethylstyrene, 2-t-butylstyrene, 3-t-butylstyrene, 4-t-butylstyrene, vinylxylene, vinylnaphthalene, vinyltoluene, vinylpyridine, diphenylethylene, tertiary amino group-containing diphenylethylene and the like. Above all, preferred are styrene and the like.

These compounds may be used either alone or as a combination of two or more thereof.

From the viewpoint that it is possible to obtain the modified conjugated diene polymers having active lithium ends, all these aromatic vinyl compounds have a similar function, and in the present invention, it is possible to use even one not described in examples described later.

When the conjugated diene compound and the aromatic vinyl compound are used in combination, 1,3-butadiene and styrene are preferably used. These compounds are excellent in high living properties in anion polymerization as well as easy availability.

Further, when a solution polymerization process is used, the monomer concentration in a solvent is preferably from 5 to 50% by mass, and more preferably from 10 to 30% by mass, from the viewpoint of maintaining a balance between productivity and easiness of polymerization control.

In this connection, when copolymerization is conducted using the conjugated diene compound and the aromatic vinyl compound, the content of the aromatic vinyl compound in a charged monomer mixture is preferably from 3 to 55% by mass, and more preferably from 5 to 50% by mass, from the viewpoint of a balance between low hysteresis loss characteristics and wet skid resistance of the resulting crosslinked polymer.

In the present invention, a compound other than the conjugated diene compound and the aromatic vinyl compound (hereinafter referred to as another monomer) may also be used as the monomer.

The other monomers include functional group-containing monomers. A functional group in the polymer can be activated with a polymerization initiator by using the functional group-containing monomer. In addition, it is also advantageous, for example, to lithiate a functional group moiety of a copolymer containing an isobutylene unit, a paramethylstyrene unit and a para-halogenated methylstyrene unit to form an active site.

Examples of the other monomers include 1-(4-N,N-dimethylaminophenyl)-1-phenylethylene and the like.

In this connection, in the present invention, "the conjugated diene compound is polymerized to obtain the modified conjugated diene polymer" and "the conjugated diene compound and the aromatic vinyl compound are polymerized to obtain the modified conjugated diene polymer" shall each be considered to include the case where "the conjugated diene compound and the other monomer are polymerized to obtain the modified conjugated diene polymer" and the case where "the conjugated diene compound, the aromatic vinyl compound and the other monomer are polymerized to obtain the modified conjugated diene polymer", respectively.

The modified conjugated diene polymer of the present invention is produced by anion-polymerizing the monomer such as the conjugated diene compound in the presence of the at least one compound selected from the group consisting of the above-mentioned formulae (1) and (2) and the alkali metal compound or the alkaline earth metal compound.

As a polymerization process, any one of a solution polymerization process, a gas phase polymerization process and a bulk polymerization process can be used. Above all, preferred is the solution polymerization process. Further, as a polymerization system, either of a batch system and a continuous system can be used.

Specific examples of the polymerization processes in the case where the solution polymerization process is used include a process of anion-polymerizing the monomer such as the conjugated diene compound in the presence of a polymerization initiator and a randomizer used as needed, in a solvent composed of an organic solvent (for example, an aliphatic, alicyclic or aromatic hydrocarbon compound or the like) inactive to the reaction.

The hydrocarbon compound used as the solvent is preferably a compound having 3 to 8 carbon atoms.

Examples of such compounds having 3 to 8 carbon atoms include propane, n-butane, isobutane, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, cyclohexene and the like.

The hydrocarbon compounds may be used either alone or as a combination of two or more thereof.

The randomizer (vinyl content adjusting agent) used as needed is used for adjustment of the content of vinyl bonds (1,2 bonds and 3,4 bonds) (also referred to as the vinyl content in this specification), and the like.

Examples of the randomizers include dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine and the like.

The randomizers may be used either alone or as a combination of two or more thereof.

The temperature of the polymerization reaction is preferably from −20 to 150° C., more preferably from 0 to 120° C., and particularly preferably from 20 to 100° C.

The polymerization reaction is preferably conducted under a pressure sufficient to keep the monomer substantially in a liquid phase. Such a pressure can be obtained by a method such as pressurization of the inside of a reaction vessel with a gas inactive to the polymerization reaction.

In the method for producing a modified conjugated diene polymer of the present invention, to the above-mentioned polymerization step (a), there may be added a modification step (b) in which the active lithium end-containing modified conjugated diene polymer obtained in the above-mentioned polymerization step is reacted with a silane compound (modifying agent) reactable with the active lithium end of the modified conjugated diene polymer to obtain a modified conjugated diene polymer which has been reacted with the silane compound.

By using the silane compound reactable with the active lithium end, excellent low hysteresis loss characteristics and the like can be given to the crosslinked polymer by reacting the modified conjugated diene polymer obtained in the polymerization step with the silane compound.

The silane compounds reactable with the active lithium end include, for example, alkoxysilane compounds each having at least one alkoxy group, which are represented by the following formula (3), from the viewpoint of reactivity with the active lithium end-containing modified conjugated diene polymer.

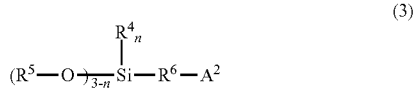

In the formula (3), $A^2$ is a functional group having at least one atom selected from the group consisting of N, P and S, having no active hydrogen and bound to $R^6$ by any one atom of the above N, P and S. In a part or all of the above-mentioned at least one atom selected from the group consisting of the above N, P and S of $A^2$, three H's (hydrogen atoms) in a "—$SiH_3$" structure may each be protected by a hydrocarbylsilyl group substituted by a hydrocarbyl group. $R^4$ and $R^5$ are hydrocarbyl groups, and preferably alkyl groups having 1 to 20 carbon atoms or aryl groups having 6 to 20 carbon atoms. n is an integer of 0 to 2. $R^6$ is a hydrocarbylene group, and preferably straight-chain or branched alkylene or arylene having 1 to 20 carbon atoms, which may contain a cyclic structure. In the formula (3), $R^4$ and $R^5$ which are each present in plurality may each be same or different.

Here, the active hydrogen is a hydrogen atom linked to an atom other than carbon, and preferably one having a bond energy lower than a carbon-hydrogen bond of polymethylene.

In this connection, for the purpose of adjusting the Mooney viscosity of the modified conjugated diene polymer, silicon tetrachloride, tin tetrachloride or an epoxy group-containing compound (for example, such as tetraglycidyl-1,3-bisaminomethylcyclohexane) may be used together with the silane compound reactable with the active lithium end.

In the present invention, from the viewpoint of enhancing reactivity with the active lithium end-containing modified conjugated diene polymer, an alkoxysilane compound having two or more alkoxy groups is preferably used.

The compound represented by the above-mentioned formula (3) is added to and reacted with the modified conjugated diene polymer obtained in the above-mentioned polymerization step, by which it is possible to obtain a modified conjugated diene polymer having a structure represented by the following formula (6):

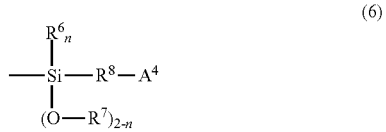

(In the formula (6), $A^4$ is a functional group having at least one atom selected from the group consisting of N, P and S and bound to $R^8$ by any one atom of the above N, P and S. A part or all of the above-mentioned at least one atom selected from the group consisting of the above N, P and S of $A^4$ may be protected by a hydrocarbylsilyl group. $R^6$ is a hydrocarbyl group. $R^7$ is a hydrogen atom or a hydrocarbyl group. n is an integer of 0 to 2. $R^8$ is a hydrocarbylene group. In the formula, $R^6$ and $R^7$ which are each present in plurality may each be same or different.)

In the present invention, one having a group which can become an onium by an onium-forming agent, in addition to the group reactable with the active lithium end, is preferably used as the silane compound reactable with the active lithium end. By having the group which can become the onium by the onium-forming agent, excellent shape retention properties are given to the crosslinked polymer, which makes it possible to prevent cold flow.

The group which can become the onium by the onium-forming agent is a group corresponding to $A^2$ of the above-mentioned formula (3). The group which can become the onium by the onium-forming agent is a group substituted by a protective group in order to prevent a reaction thereof with the alkali metal or alkaline earth metal active end of the modified conjugated diene polymer, and a group which can become the onium by a function of the onium-forming agent. It is only necessary that at least one group which can become the onium is present in the molecule. Specific examples thereof include a nitrogen-containing group in which two hydrogen atoms of a primary amino group are substituted by two protective groups, a nitrogen-containing group in which one hydrogen atom of a secondary amino group is substituted by one protective group, a tertiary amino group, an imino group, a pyridyl group, a phosphorus-containing group in which two hydrogen atoms of a primary phosphino group are substituted by two protective groups, a phosphorus-containing group in which one hydrogen atom of a secondary phosphino group is substituted by one protective group, a tertiary phosphino group, a sulfur-containing group in which one hydrogen atom of a thiol is substituted by one protective group, and the like.

Compounds each having the nitrogen-containing group in which two hydrogen atoms of a primary amino group are substituted by two protective groups, the nitrogen-containing group in which one hydrogen atom of a secondary amino group is substituted by one protective group or the tertiary amino groups and an alkoxysilyl group include, for example, N,N-bis(trimethylsilyl)aminopropyltrimethoxysilane, N,N-bis(trimethyl-silyl)aminopropylmethyldiethoxysilane, N,N',N'-tris(trimethylsilyl)-N-(2-aminoethyl)-3-aminopropyltriethoxysilane, 1-(3-triethoxysilylpropyl)-2,2,5,5-tetramethyl-1-aza-2,5-disilacyclopentane, 1-trimethylsilyl-2,2-dimethoxy-1-aza-2-silacyclopentane, N-[3-(trimethoxysilyl)-propyl]-N,N-diethyl-N-trimethylsilyl-ethane-1,2-diamine, N-[3-(methyl-dimethoxysilyl)-propyl]-N,N'-diethyl-N'-trimethylsilyl-p-phenylenediamine, 3-[3-(trimethylsilylethylamino)-1-pyrrolidinyl]-propyl-methyldiethoxysilane, N-[3-(diethoxymethylsilyl)-propyl]-N-ethyl-N'-(2-ethoxyethyl)-N'-trimethylsilyl-ethane-1,2-diamine, 3-(4-trimethylsilyl-1-piperazino)propylmethyldimethoxysilane, N-trimethylsilyl-N-methylaminopropylmethyldiethoxysilane, 3-(4-trimethylsilyl-1-piperazino)propyltriethoxysilane, N-[2-(trimethoxysilyl)-ethyl]-N,N',N'-trimethylethane-1,2-diamine, 1-[3-(triethoxysilyl)-propyl]-4-methylpiperazine, 1-[3-(trimethoxysilyl)-propyl]-3-methylimidazolidine, 2-(3-trimethoxysilyl-propyl)-1,3-dimethylimidazolidine, 1-[3-(triethoxysilyl)-propyl]-3-methylhexahydropyrimidine, 3-[3-(tributoxysilyl)-propyl]-1-methyl-1,2,3,4-tetrahydropyrimidine, 1-(2-ethoxyethyl)-3-[3-(trimethoxysilyl)-propyl]-imidazolidine, 2-{3-[3-(trimethoxysilyl)-propyl]-tetrahydropyrimidine-1-yl}-ethyldimethylamine, 2-(trimethoxysilyl)-1,3-dimethylimidazolidine, 2-(triethoxysilyl)-1,4-diethylpiperazine, 5-(triethoxysilyl)-1,3-dipropylhexahydropyrimidine, 5-(diethoxyethylsilyl)-1,3-diethylhexahydropyrimidine, 2-[3-(2-dimethylaminoethyl)-2-(3-ethyldimethoxysilyl-propyl)-imidazolidin-1-yl]-ethyldimethylamine, 5-(3-trimethoxysilyl-propyl)-1,3-bis-(2-methoxyethyl)-hexahydropyrimidine, 3-dimethylaminopropyltrimethoxysilane, 3-dimethylaminopropylmethyldimethoxysilane, 3-morpholinopropylmethyldimethoxysilane, 3-piperidinopropyltrimethoxysilane, 3-piperidinopropylmethyldimethoxysilane, 3-diethylaminopropyltriethoxysilane, bis[3-(triethoxysilyl)propyl]trimethylsilylamine, bis[3-(trimethoxysilyl)propyl]trimethylsilylamine, 3-(4-methyl-1-pipreradino)propyltriethoxysilane, compounds in which alkyl groups or alkylene groups in the above-mentioned compounds are substituted with alkyl groups or alkylene groups having 1 to 6 carbon atoms, and the like.

Above all, preferred examples of the compounds include N,N-bis(triethylsilyl)aminopropylmethyldimethoxysilane, N,N-bis(trimethylsilyl)aminopropylmethyldimethoxysilane, N,N-bis(trimethylsilyl)aminopropylmethyldiethoxysilane, N,N-bis(trimethylsilyl)aminopropyltriethoxysilane, 1-(3-triethoxysilylpropyl)-2,2,5,5-tetramethyl-1-aza-2,5-disilacyclopentane, N,N',N'-tris(trimethylsilyl)-N-(2-aminoethyl)-3-aminopropyltriethoxysilane, 1-trimethylsilyl-2,2-dimethoxy-1-aza-2-silacyclopentane, N-[3-(trimethoxysilyl)-propyl]-N,N'-diethyl-N'-trimethylsilyl-ethane-1,2-diamine, N-[3-(triethoxysilyl)-propyl]-N,N'-diethyl-N'-trimethylsilyl-ethane-1,2-diamine, N-trimethylsilyl-N-methylaminopropylmethyldiethoxysilane, 3-(4-trimethylsilyl-1-piperazino)propyltriethoxysilane, N-[2-(trimethoxysilyl)-ethyl]-N,N',N'-trimethylethane-1,2-diamine, 1-[3-(triethoxysilyl)-propyl]-4-methylpiperazine, 2-(trimethoxysilyl)-1,3-dimethylimidazolidine, 2-(3-trimethoxysilyl-propyl)-1,3-dimethylimidazolidine, 3-dimethylaminopropyltrimethoxysilane, 3-diethylaminopropyltrimethoxysilane, 3-dimethylaminopropyltriethoxysilane, 3-diethylaminopropyltriethoxysilane, bis[3-(triethoxysilyl)propyl]trimethylsilylamine, bis[3-(trimethoxysilyl)propyl]trimethylsilylamine, 3-(4-methyl-1-pipreradino)propyltriethoxysilane and the like.

Compounds each having the imino group or the pyridyl group and an alkoxysilyl group include N-(1,3-dimethylbutylidene)-3-(triethoxysilyl)-1-propanamine, N-(1-methylpropylidene)-3-(triethoxysilyl)-1-propanamine, N-(4-N,N-dimethylaminobenzylidene)-3-(triethoxysilyl)-1-propanamine, N-(cyclohexylidene)-3-(triethoxysilyl)-1-propanamine, and trimethoxysilyl compounds, methyldiethoxysilyl compounds and ethyldimethoxysilyl compounds corresponding to these triethoxysilyl compounds, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, 3-hexamethyleneiminopropyltrimethoxysilane, 3-hexamethyleneiminopropylmethyldimethoxysilane, compounds in which alkyl groups or alkylene groups in the above-mentioned compounds are substituted with alkyl groups or alkylene groups having 1 to 6 carbon atoms, and the like.

Above all, preferred examples of the compounds include N-(1,3-dimethylbutylidene)-3-(triethoxysilyl)-1-propanamine, N-(1-methylpropylidene)-3-(triethoxysilyl)-1-propanamine, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole and the like.

Compounds each having the phosphorus-containing group in which two hydrogen atoms of a primary phosphino group are substituted by two protective groups, the phosphorus-containing group in which one hydrogen atom of a secondary phosphino group is substituted by one protective group, the tertiary phosphino group or the sulfur-containing group in which one hydrogen atom of a thiol is substituted by one protective group and an alkoxysilyl group include P,P-bis(trimethylsilyl)phosphinopropylmethyldimethoxysilane, P,P-bis(trimethylsilyl)phosphinopropyltrimethoxysilane, 3-dimethylphosphinopropyltrimethoxysilane, 3-dimethylphosphinopropylmethyldimethoxysilane, 3-diphenylphosphinopropyltrimethoxysilane, 3-diphenylphosphinopropyltriethoxysilane, 3-diphenylphosphinopropylmeryldimethoxysilane, S-trimethylsilylmercaptopropylmethyldimethoxysilane, S-tri-methylsilylmercaptopropyltrimethoxysilane, S-trimethylsilylmercaptopropyltriethoxysilane, S-trimethylsilylmercaptopropylmethyldiethoxysilane and compounds in which alkyl groups or alkylene groups in the above-mentioned compounds are substituted with alkyl groups or alkylene groups having 1 to 6 carbon atoms, and the like.

Above all, preferred examples of the compounds include 3-dimethylphosphinopropyltrimethoxysilane, 3-diphenylphosphinopropyltriethoxysilane, S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane and the like.

The active lithium end site and the alkoxy group site are bound to each other by reacting the active lithium end-containing modified conjugated diene polymer with the alkoxysilane compound as silane compound reactable with the above-mentioned active lithium end, by which being able to obtain the modified conjugated diene polymer having the group which can become the onium. Further, from the viewpoint that the above-mentioned alkoxysilane compounds are reactable with the active lithium end-containing modified conjugated diene polymer and react or interact with carbon black and/or silica to give excellent low hysteresis loss characteristics to the crosslinked polymer, all of them have a similar function, and in the present invention, it is possible to use even one not described in examples described later.

A modification reaction for obtaining the modified conjugated diene polymer reacted with the silane compound by reacting the modified conjugated diene polymer with the silane compound (modifying agent) can be carried out, for example, as a solution reaction. The solution reaction may be carried out using a solution containing the unreacted monomer after the termination of the polymerization reaction.

The modification reaction may be conducted by either a batch system using a batch type reactor or a continuous system using an apparatus such as a multistage continuous reactor. Further, the modification reaction is preferably conducted after the termination of the polymerization reaction, before performing desolvation treatment, water treatment, heat treatment, various operations necessary for isolating the polymer, and the like.

The amount of the silane compound reactable with the active lithium end in this modification reaction is preferably 0.1 molar equivalents or more, and more preferably 0.3 molar equivalents or more, based on the active site of the modified conjugated diene polymer obtained by the anion polymerization. When the amount is less than 0.1 molar equivalents, the progress of the modification reaction is not sufficient, dispersibility of a reinforcing agent such as carbon black is not sufficiently improved, and wear resistance, wet skid resistance and low hysteresis loss characteristics of the crosslinked polymer are sometimes deteriorated.

Methods for adding the silane compound are not particularly limited, and include a method of batch addition, a method of divided addition, a method of continuous addition, and the like. Above all, preferred is the method of batch addition.

The temperature of the modification reaction is same as the polymerization temperature in the above-mentioned polymerization step, and it is preferably from −20 to 150° C., more preferably from 0 to 120° C., and particularly preferably from 20 to 100° C. When the temperature is low, the viscosity of the modified conjugated diene polymer tends to be increased. When the temperature is high, the active lithium end becomes easily deactivated.

The reaction time of the modification reaction is preferably from 1 minute to 5 hours, and more preferably from 2 minutes to 1 hour.

The modified conjugated diene polymer reacted with the silane compound, which is obtained in the above-mentioned modification step, has at least one structure selected from the group represented by the following formulae (4) and (5) and a structure represented by the following formula (6):

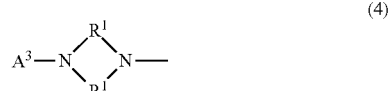

(4)

(5)

(In the formulae (4) and (5), $A^3$ is a hydrogen atom or a hydrocarbylsilyl group (for example, a hydrocarbylsilyl group in which three H's (hydrogen atoms) in a "—$SiH_3$" structure are each substituted by a hydrocarbyl group). $R^1$ and $R^2$ are hydrocarbylene groups. In the formula (5), $A^3$ present in plurality may each be same or different.)

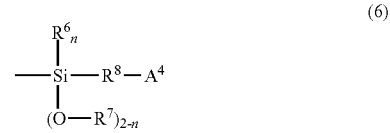

(6)

(In the formula (6), $A^4$ is a functional group having at least one atom selected from the group consisting of N, P and S and bound to $R^8$ by any one atom of the above N, P and S. A part or all of the above-mentioned at least one atom selected from the group consisting of the above N, P and S of $A^4$ may be protected by a hydrocarbylsilyl group (for example, a hydrocarbylsilyl group in which three H's (hydrogen atoms) in a "—$SiH_3$" structure are each substituted by a hydrocarbyl group). Further, $A^4$ may have no active hydrogen. $R^6$ is a hydrocarbyl group. $R^7$ is a hydrogen atom or a hydrocarbyl group. n is an integer of 0 to 2. $R^8$ is a hydrocarbylene group. In the formula, $R^6$ and $R^7$ which are each present in plurality may each be same or different.)

In the present invention, an onium structure can be introduced into the modified conjugated diene polymer by mixing the modified conjugated diene polymer obtained in the above-mentioned polymerization step and modification step with the onium-forming agent.

Examples of the onium-forming agents include metal halides such as silicon halide compounds, tin halide compounds, aluminum halide compounds, titanium halide compounds, zirconium halide compounds, germanium halide compounds, gallium halide compounds and zinc halide compounds; esters of inorganic acids such as sulfuric acid esters, phosphoric acid esters, carbonic acid esters and nitric acid esters; inorganic acids such as hydrofluoric acid, hydrochloric acid, hydrobromic acid, hydroiodic acid, sulfuric acid, nitric acid, carbonic acid and phosphoric acid; inorganic acid salts such as potassium fluoride, tetramethylammonium fluoride and tetra-n-butylammonium fluoride; organic acids such as carboxylic acids (for example, maleic acid) and sulfonic acids; and the like.

Above all, preferred are the silicon halide compounds, tin halide compounds, aluminum halide compounds, titanium halide compounds, zirconium halide compounds, germanium halide compounds, gallium halide compounds, zinc halide compounds, sulfuric acid esters, phosphoric acid esters, carboxylic acids and sulfonic acids, because of easy availability and easy handling of the compounds.

Examples of the compounds of the onium-forming agents include silicon tetrachloride, tin tetrachloride, trimethylsilyl chloride, dimethyldichlorosilane, diethyl aluminum chloride, zinc chloride, titanium tetrachloride, zirconium tetrachloride, germanium tetrachloride, gallium trichloride, diethyl sulfate, trimethyl phosphate, dimethyl carbonate, maleic acid, benzenesulfonic acid and the like.

Shape retention properties of the modified conjugated diene polymer can be enhanced by using the onium-forming agent.

Mixing of the modified conjugated diene polymer and the onium-forming agent can be performed, for example, in a solution form. The mixing may be preformed either as a batch system using a batch type mixer or as a continuous system using an apparatus such as a multistage continuous mixer or an inline mixer.

The amount of the onium-forming agent is preferably 0.5 molar equivalents or more, and more preferably 1.0 molar equivalent or more, based on the active site (modified moiety) of the modified conjugated diene polymer. When the amount is less than 0.5 molar equivalents, onium conversion does not sufficiently proceed, sometimes resulting in deteriorated shape retention characteristics of the modified conjugated diene polymer.

Methods for adding the onium-forming agent are not particularly limited, and include a method of batch addition, a method of divided addition, a method of continuous addition, and the like. Above all, preferred is the method of batch addition.

The temperature at the time when the modified conjugated diene polymer and the onium-forming agent are mixed is same as the above-mentioned polymerization temperature of the modified conjugated diene polymer, and preferably from −20 to 150° C., more preferably from 0 to 120° C., and particularly preferably from 20 to 100° C. When the temperature is low, the viscosity of the modified conjugated diene polymer tends to increase. When the temperature is high, the active lithium end becomes easily deteriorated.

After the mixing of the modified conjugated diene polymer and the onium-forming agent, the modified conjugated diene polymer can be collected by a desolvation method (for example, steam stripping or the like) and drying operation known in the production of the modified conjugated diene polymer.

Formation of the onium structure in the modified conjugated diene polymer is performed in the presence of water. Methods for forming the onium structure include, for example, (i) a method of directly adding water into a solution of the modified conjugated diene polymer, followed by mixing, (ii) a method of adding a solution obtained by dissolving water in an organic solvent such as an alcohol which is soluble in both water and an organic solvent into a solution of the modified conjugated diene polymer, followed by mixing, and (iii) a method of mixing the modified conjugated diene polymer and water at same time as desolvation in a steam stripping step.

In this case, the polymer solution obtained in preparing the modified conjugated diene polymer may be used in a state of the polymer solution without performing desolvation. Further, the modified conjugated diene polymer obtained by desolvating the above-mentioned polymer solution by steam stripping or the like, followed by further drying, may be dissolved again in a solvent such as cyclohexane to use.

The modified conjugated diene polymer of the present invention is adjusted in the Mooney viscosity by addition of an extender oil, and the like, as needed, by which workability thereof is able to be improved.

The extender oils include aroma oil, naphthenic oil, paraffin oil and the like. The amount of the extender oil is, for example, from 10 to 50 parts by mass based on 100 parts by mass of the modified conjugated diene polymer.

The modified conjugated diene polymer into which the onium structure is introduced has, for example, at least one structure selected from the group represented by the above-mentioned formulae (4) and (5) and a structure represented by the following formula (7):

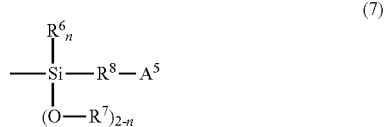

(In the formula (7), $A^5$ is a group in which a functional group having at least one atom selected from the group consisting of N, P and S and bound to $R^8$ by any one atom of the above N, P and S is converted into an onium. A part or all of the above-mentioned at least one atom selected from the group consisting of the above N, P and S of $A^5$ may be protected by a hydrocarbylsilyl group (for example, a hydrocarbylsilyl group in which three H's (hydrogen atoms) in a "—$SiH_3$" structure are each substituted by a hydrocarbyl group). Further, $A^5$ may have no active hydrogen. $R^6$ is a hydrocarbyl group. $R^7$ is a hydrogen atom or a hydrocarbyl group. n is an integer of 0 to 2. $R^8$ is a hydrocarbylene group. In the formula, $R^6$ and $R^7$ which are each present in plurality may each be same or different.)

The polymer composition of the present invention contains the above-mentioned modified conjugated diene polymer as a polymer component.

Further, the polymer composition of the present invention may contain a polymer component other than the above-mentioned modified conjugated diene polymer (hereinafter also referred to as another polymer component).

The other polymer components include natural rubber, synthetic isoprene rubber, butadiene rubber, modified butadiene rubber, styrene-butadiene rubber, modified styrene-butadiene rubber, ethylene-α-olefin copolymerized rubber, ethylene-α-olefin-diene copolymerized rubber, acrylonitrile-butadiene copolymerized rubber, chloroprene rubber, halogenated butyl rubber, styrene-isoprene copolymerized rubber, butadiene-isoprene copolymer rubber, random styrene-butadiene-isoprene copolymerized rubber, styrene-acrylonitrile-butadiene copolymerized rubber, acrylonitrile-butadiene copolymerized rubber, polystyrene-polybutadiene-polystyrene block copolymer and mixtures thereof, and the like.

Even when another polymer component which can be used as a polymer composition for a tire is contained, it is possible to produce the crosslinked polymer excellent in low hysteresis loss characteristics.

The ratio of the modified conjugated diene polymer in the polymer composition of the present invention is preferably 20% by mass or more, more preferably 30% by mass or more, and particularly preferably 40% by mass or more. When the ratio is 20% by mass or more, it is possible to more improve mechanical characteristics such as tensile strength and tensile elongation of the crosslinked polymer, crack growth resistance and wear resistance.

The polymer composition of the present invention may contain carbon black and/or silica.

The carbon blacks include furnace black typified by SRF, GPF, FEF, HAF, ISAF, SAF, ISAF-HS, ISAF-LS, IISAF-HS, HAF-HS and HAF-LS, acetylene black, thermal black, channel black and graphite, and further include carbon blacks of respect grades such as graphite fiber and fullerene. Above all, preferred are the carbon blacks having an iodine adsorption (IA) of 60 mg/g or more and a dibutyl phthalate oil absorption (DBP) of 80 ml/100 g or more. Further, from the viewpoint of improving wear resistance of the modified conjugated diene polymer, more preferred are HAF, ISAF and SAF.

Use of the carbon black increases effects of improving grip performance and fracture resistance characteristics of the crosslinked polymer.

The carbon blacks may be used either alone or as a combination of two or more thereof.

The silicas include wet silica (hydrated silicic acid), dry silica (silicic acid anhydride), colloidal silica, precipitated silica, calcium silicate, aluminum silicate and the like. Above all, preferred is wet silica, from the viewpoint that effects of improving fracture resistance characteristics and achieving compatibility between wet grip properties and low rolling resistance are most remarkable. Further, preferred examples thereof also include high dispersible type silica, from the viewpoint of improving dispersibility thereof into the polymer composition to improve physical properties and workability.

The silicas may be used either alone or as a combination of two or more thereof.

The amount of carbon black and/or silica (when both of these are contained, the total amount) in the polymer composition of the present invention is preferably from 20 to 130 parts by mass, and more preferably from 25 to 110 parts by mass, based on 100 parts by mass of the polymer components (the total of the modified conjugated diene polymer and other polymer components), from the viewpoint of reinforcement properties and effects of improving various physical properties thereby. When the amount is less than 20 parts by mass, an effect of improving fracture resistance characteristics and the like tends to become insufficient. When the amount exceeds 130 parts by mass, workability of the polymer composition tends to be decreased.

Further, excellent advantages similar to those obtained when carbon black and silica are used in combination can be obtained by incorporating a carbon-silica dual phase filler into the polymer composition of the present invention. The carbon-silica dual phase filler is so-called silica coating carbon black in which silica is chemically bonded to a surface of carbon black, and commercially available from Cabot Corporation as CRX2000, CRX2002 or CRX2006 (trade name). The amount of the carbon-silica dual phase filler incorporated is preferably from 1 to 100 parts by mass, and more preferably from 5 to 95 parts by mass, based on 100 parts by mass of the total of the polymer components.

When silica is contained as a reinforcing agent in the polymer composition of the present invention, a silane coupling agent is preferably incorporated in order to more improve its reinforcing effect. The silane coupling agents include, for example, bis-(3-triethoxysilylpropyl)tetrasulfide, 3-mercaptopropyltrimethoxysilane, 3-triethoxysilylpropyl-N,N-dimethylthiocarbamoyl tetrasulfide, 3-triethoxysilylpropylbenzothiazole tetrasulfide, 3-triethoxysilylpropyl methacrylate monosulfide, mercaptosilane compounds exemplified in JP-A-2006-249069, and the like.

Commercially available products thereof include, for example, "NXT Silane", "NXT Z Silane", "NXT-Low-V Silane" and "NXT Ultra Low-V Silane" (trade names) manufactured by Momentive Performance Materials Inc.; "VP Si363" (trade name) manufactured by Degussa AG; "11-MERCAPTOUNDECYLTRIMETHOXYSILANE" (trade name) manufactured by Gelest, Inc.; and the like.

Of these, preferred are bis(3-triethoxysilylpropyl)polysulfide, 3-trimethoxysilylpropylbenzothiazyl tetrasulfide and the mercaptosilane compounds exemplified in JP-A-2006-249069, in terms of an effect of improving reinforcement properties. In this connection, these silane coupling agents may be used either alone or as a combination of two or more thereof. Although the amount of the silane coupling agent incorporated varies depending on the type of silane coupling agent and the like, it is preferably from 1 to 20 parts by mass, and more preferably from 3 to 15 parts by mass, based on 100 parts by mass of silica. When the amount is less than 1 part by mass, it tends to become difficult to sufficiently exert the effect as the coupling agent. When the amount exceeds 20 parts by mass, the polymer component tends to be gelled.

In preparing the polymer composition of the present invention, for the purpose of improving workability at the time of kneading or further improving a balance among wet-skid resistance, low hysteresis loss characteristics and wear resistance, a compatibilizing agent may be added at the time of kneading.

Organic compounds as the compatibilizing agents include epoxy group-containing compounds, carboxylic acid compounds, carboxylic acid ester compounds, ketone compounds, ether compounds, aldehyde compounds, hydroxyl group-containing compounds and amino group-containing compounds. Above all, the epoxy group-containing compounds, amino group-containing compounds and hydroxyl group-containing compounds are preferred.

Silicone compounds as the compatibilizing agents include alkoxysilane compounds, siloxane compounds, silazane compounds and aminosilane compounds. Above all, preferred are the silazane compounds, aminosilane compounds and siloxane compounds.

The polymer composition of the present invention may contain various chemicals, additives and the like which are usually used in rubber industries, as needed. Examples of such chemicals or additives include crosslinking agents (vulcanizing agents), vulcanizing aids, processing aids, vulcanization accelerators, process oils, anti-aging agents, antiscorching agents, zinc oxide, stearic acid and the like.

The vulcanizing agents (crosslinking agents) include sulfur, sulfur halides, organic peroxides, quinone dioximes, organic multivalent amine compounds, methylol group-containing alkylphenol resins and the like. Above all, sulfur is usually used. The amount of sulfur is preferably from 0.1 to 5 parts by mass, and more preferably from 0.5 to 3 parts by mass, based on 100 parts by mass of the polymer components (the total of the modified conjugated diene polymer and other polymer components).

As the vulcanizing aid and processing aid, stearic acid is usually used.

The amount of the vulcanizing aid and processing aid is usually from 0.5 to 5 parts by mass based on 100 parts by mass of the polymer components.

Further, although it is not particularly limited, the vulcanization accelerators include sulfenamide-based, guanidine-based, thiuram-based, thiourea-based, thiazole-based, dithiocarbamic acid-based and xanthic acid-based compounds, and preferably include 2-mercaptobenzothiazole, dibenzothiazyl disulfide, N-cyclohexyl-2-benzothiazyl sulfenamide, N-t-butyl-2-benzothiazole sulfenamide, N-oxyethylene-2-benzothiazole sulfenamide, N-oxyethylene-2-benzothiazole sulfenamide, N,N'-diisopropyl-2-benzothiazole sulfenamide, diphenylguanidine, diorthotriguanidine, orthotolylbisguanidine and the like.

The amount of the vulcanization accelerator is usually from 0.1 to 5 parts by mass, and preferably from 0.4 to 4 parts by mass, based on 100 parts by mass of the polymer components.

The polymer composition of the present invention can be produced by kneading, using a kneader such as an open kneader (for example, a roll) or a closed kneader (for example, a Banbury mixer).

Further, the polymer composition of the present invention is applicable as the crosslinked polymer to various rubber products by performing crosslinking (vulcanization) after molding processing.

Examples of the crosslinked polymers include tire applications such as tire treads, under treads, carcasses, side walls and bead portions; and applications such as vibration absorbing rubber, fenders, belts, hoses and other industrial products. The crosslinked polymer of the present invention is particularly suitably used as tire tread rubber, from the viewpoint of giving low-fuel consumption performance.

EXAMPLES

Although the present invention will be specifically described below based on examples, the present invention should not be construed as being limited to these examples. In this connection, "parts" and "%" in examples and comparative examples are on a mass basis, unless otherwise specified.

Example 1

Synthesis of Modified Conjugated Diene Polymer A and Evaluation Thereof

A nitrogen-replaced autoclave reactor having an internal volume of 5 liters was charged with 4.20 mmol of N-trimethylsilylpiperazine, 2,500 g of cyclohexane, 50 g of tetrahydrofuran, 125 g of styrene and 365 g of 1,3-butadiene. After adjusting the temperature of the contents of the reactor to 10° C., 5.20 mmol of n-butyllithium was added to initiate polymerization. The polymerization was conducted under adiabatic conditions, and the maximum temperature reached 85° C.

In this connection, N-trimethylsilylpiperazine is a compound represented by the above-mentioned formula (10).

At the time when the polymerization conversion reached 99% (after an elapse of time of 26 minutes from the initiation of the polymerization), 10 g of 1,3-butadiene was further added over 2 minutes, and the polymerization was further conducted for 3 minutes. Thereafter, 4.46 mmol of N,N-bis(trimethylsilyl)aminopropylmethyldiethoxysilane was added thereto, and a reaction was conducted for 15 minutes to obtain a polymer solution containing a modified conjugated diene polymer.

To the resulting modified conjugated diene polymer-containing polymer solution, 2.0 g of 2,6-di-tert-butyl-p-cresol was added, and then, desolvation was performed by performing steam striping by using hot water adjusted to pH 9 with sodium hydroxide to obtain a modified conjugated diene polymer. Thereafter, the modified conjugated diene polymer was dried by using a hot roll adjusted to 110° C. to obtain a modified conjugated diene polymer A.

The polymerization formula of the modified conjugated diene polymer A is shown in Table 1, and properties of the modified conjugated diene polymer A obtained are shown in Table 2. Further, a polymer composition prepared according to the compounding shown in Table 3 with using the modified conjugated diene polymer A was vulcanized, and for the resulting crosslinked polymer (vulcanized polymer), physical properties were evaluated. The results thereof are shown in Table 4.

Examples 2 to 15 and Comparative Examples 1 and 2

Synthesis of Modified Conjugated Diene Polymers B to Q and Evaluation Thereof

Modified conjugated diene polymers B to Q were obtained in same manner as in the case of the modified conjugated diene polymer A with the exception that the polymerization formulae shown in Table 1 were used. Properties of the resulting modified conjugated diene polymers B to Q are shown in Table 2. Further, polymer compositions prepared according to the compounding formulae shown in Table 3 using the modified conjugated diene polymers B to Q were vulcanized, and physical properties thereof were evaluated. The results thereof are shown in Table 4.

Moreover, in the case of synthesis of the modified conjugated diene polymers K and L, 9.03 mmol of maleic acid or 4.52 of silicon tetrachloride was further added after the addition of 2,6-di-tert-butyl-p-cresol.

In this connection, N-(tert-butyldimethylsilyl)piperazine of Example 2 is a compound of the above-mentioned formula (11). Further, 1,3-ditrimethylsilyl-1,3,5-triazinane of Example 3 is a compound of the above-mentioned formula (12).

[Characteristic Evaluation of Modified Conjugated Diene Polymer]

Measuring methods of various physical property values of the modified conjugated diene polymer are shown below.
(i) Styrene Unit Amount (%): Determined by $^1$H-NMR of 500 MHz.
(ii) Vinyl Content (%): Determined by $^1$H-NMR of 500 MHz.
(iii) Weight Average Molecular Weight before Modification: Determined in terms of polystyrene from the retention time corresponding to the maximum peak height of a GPC curve obtained with using gel permeation chromatography (GPC), (HLC-8120GPC (trade name (manufactured by Tosoh Corporation))).
(GPC Conditions)
  Column: Trade name "GMHHXL" (manufactured by Tosoh Corporation), 2 columns
  Column temperature: 40° C.
  Mobile phase: Tetrahydrofuran
  Flow rate: 1.0 ml/min
  Sample concentration: 10 mg/20 ml
(iv) Mooney Viscosity (ML1+4, 100° C.): Determined in accordance with JIS K6300 with using an L-rotor under conditions of preheating for 1 minute, a rotor operation time of 4 minutes and a temperature of 100° C.

[Method for Kneading Polymer Composition and Characteristic Evaluation]

By using a plastomill (internal volume: 250 ml) equipped with a temperature controller, the modified conjugated diene polymer of the present invention, polybutadiene rubber, an extender oil, carbon black, silica, a silane coupling agent, stearic acid, an anti-aging agent and zinc oxide were kneaded under conditions of a filling rate of 72% and a rotation number of 60 rpm, as first-step kneading. Then, the composition obtained above was cooled to room temperature, and thereafter kneaded with sulfur and a vulcanizing accelerator, as second-step kneading. This was molded, and vulcanized at 160° C. for a predetermined time by means of a vulcanizing press. Evaluation of characteristics representing the following tire performances was performed.
(i) Mooney viscosity (ML1+4, 100° C.): The polymer composition before vulcanization was used as a sample for measurement, and the measurement was made in accordance with JIS K6300 using an L-rotor under conditions of preheating for 1 minute, a rotor operation time of 4 minutes and a temperature of 100° C.
(ii) 0° C. tan δ: The crosslinked polymer was used as a sample for measurement, and the measurement was carried out under conditions of a shear strain of 0.1%, an angular velocity of 100 radians per second and 0° C., with using ARES-RDA (manufactured by TA Instruments Inc.). The value is indicated by the index taking that of Comparative Example 1 as 100. The larger value shows the larger and better wet skid resistance.
(iii) 70° C. tan δ: The crosslinked polymer was used as a sample for measurement, and the measurement was carried out under conditions of a shear strain of 1.0%, an angular velocity of 100 radians per second and 70° C., with using ARES-RDA (manufactured by TA Instruments Inc.). The value is indicated by the index taking that of Comparative Example 1 as 100. The larger value shows the smaller and better low hysteresis loss characteristics.
(iv) Wear Resistance: The vulcanized polymer was used as a sample for measurement, and the measurement was carried out under a load of 10 N at 25° C., in accordance with JIS K 6264, by using a DIN abrasion tester (manufactured by Toyo Seiki Seisaku-Sho, Ltd.). The value is indicated by the index taking that of Comparative Example 1 as 100. The larger value shows the better wear resistance.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| | | \multicolumn{9}{c}{Kind of Modified Conjugated Diene Polymer} |
| | | A | B | C | D | E | F | G | H | I |
| Polymerization Formula Solvent | | | | | | | | | | |
| Cyclohexane | (g) | 2500 | 2500 | 2500 | 2500 | 2500 | 2500 | 2500 | 2500 | 2500 |
| Randomizer (Vinyl Content Adjusting Agent) | | | | | | | | | | |
| Tetrahydrofuran | (g) | 50 | 50 | 50 | — | — | — | — | — | 50 |
| 2,2-Di(2-tetrahydrofuryl)propane | (mmol) | — | — | — | 2.45 | 2.45 | 2.45 | 2.45 | 2.45 | — |

TABLE 1-continued

| Polymerization Monomer | | | | | | | | | | |
|---|---|---|---|---|---|---|---|---|---|---|
| Styrene | (g) | 125 | 125 | 125 | 125 | 125 | 125 | 125 | 125 | 125 |
| 1,3-Butadiene | (g) | 365 | 365 | 365 | 365 | 365 | 365 | 365 | 365 | 365 |
| Additional butadiene | (g) | 10 | 10 | 10 | 10 | 10 | 10 | 10 | 10 | 10 |
| Polymerization Initiator | | | | | | | | | | |
| n-Butyllithium | (mmol) | 5.20 | 5.20 | 5.20 | 5.20 | 5.20 | 5.20 | 5.20 | 5.20 | 5.20 |
| INI—N-1 (Compound of Formula (1)) | *1 (mmol) | 4.20 | — | — | 4.20 | 4.20 | 4.20 | 4.20 | 4.20 | 4.20 |
| INI—N-2 (Compound of Formula (1)) | *2 (mmol) | — | 4.20 | — | — | — | — | — | — | — |
| INI—N-3 (Compound of Formula (2)) | *3 (mmol) | — | — | 4.20 | — | — | — | — | — | — |
| INI—N-4 | *4 (mmol) | — | — | — | — | — | — | — | — | — |
| INI—N-5 | *5 (mmol) | — | — | — | — | — | — | — | — | — |
| Modifying Agent | | | | | | | | | | |
| N—Si-1 (Compound of Formula (3)) | *6 (mmol) | 4.46 | 4.46 | 4.46 | — | — | — | — | — | — |
| N—Si-2 (Compound of Formula (3)) | *7 (mmol) | — | — | — | 4.46 | — | — | — | — | — |
| N—Si-3 (Compound of Formula (3)) | *8 (mmol) | — | — | — | — | 4.46 | — | — | — | 2.66 |
| N—Si-4 (Compound of Formula (3)) | *9 (mmol) | — | — | — | — | — | 4.46 | — | — | — |
| N—Si-5 (Compound of Formula (3)) | *10 (mmol) | — | — | — | — | — | — | 4.46 | — | — |
| N—Si-6 (Compound of Formula (3)) | *11 (mmol) | — | — | — | — | — | — | — | 4.46 | — |
| N—O-1 | *12 (mmol) | — | — | — | — | — | — | — | — | 0.45 |
| Si—Cl-1 | *13 (mmol) | — | — | — | — | — | — | — | — | — |
| Sn—Cl-1 | *14 (mmol) | — | — | — | — | — | — | — | — | — |
| Onium Forming Agent | | | | | | | | | | |
| C—OH-1 | *15 (mmol) | — | — | — | — | — | — | — | — | — |
| Si—Cl-1 | *13 (mmol) | — | — | — | — | — | — | — | — | — |

| | | Example 10 | Example 11 | Example 12 | Example 13 | Example 14 | Example 15 | Comparative Example 1 | Comparative Example 2 |
|---|---|---|---|---|---|---|---|---|---|
| Kind of Modified Conjugated Diene Polymer | | J | K | L | M | N | O | P | Q |
| Polymerization Formula Solvent | | | | | | | | | |
| Cyclohexane | (g) | 2500 | 2500 | 2500 | 2500 | 2500 | 2500 | 2500 | 2500 |
| Randomizer (Vinyl Content Adjusting Agent) | | | | | | | | | |
| Tetrahydrofuran | (g) | 50 | 50 | 50 | 50 | 50 | 50 | 50 | 50 |
| 2,2-Di(2-tetrahydrofuryl)propane | (mmol) | — | — | — | — | — | — | — | — |
| Polymerization Monomer | | | | | | | | | |
| Styrene | (g) | 125 | 125 | 125 | 125 | 125 | 125 | 125 | 125 |
| 1,3-Butadiene | (g) | 365 | 365 | 365 | 365 | 365 | 365 | 365 | 365 |
| Additional butadiene | (g) | 10 | 10 | 10 | 10 | 10 | 10 | 10 | 10 |
| Polymerization Initiator | | | | | | | | | |
| n-Butyllithium | (mmol) | 5.20 | 5.20 | 5.20 | 5.20 | 5.20 | 5.20 | 5.20 | 5.20 |
| INI—N-1 (Compound of Formula (1)) | *1 (mmol) | 4.20 | 4.20 | 4.20 | 0.84 | 2.10 | 2.10 | — | — |
| INI—N-2 (Compound of Formula (1)) | *2 (mmol) | — | — | — | — | — | — | — | — |
| INI—N-3 (Compound of Formula (2)) | *3 (mmol) | — | — | — | — | — | 2.10 | — | — |
| INI—N-4 | *4 (mmol) | — | — | — | 3.36 | 2.10 | — | — | — |
| INI—N-5 | *5 (mmol) | — | — | — | — | — | — | 4.20 | 4.20 |
| Modifying Agent | | | | | | | | | |
| N—Si-1 (Compound of Formula (3)) | *6 (mmol) | 2.66 | 4.46 | 4.46 | 4.46 | 4.46 | 4.46 | 4.46 | — |
| N—Si-2 (Compound of Formula (3)) | *7 (mmol) | — | — | — | — | — | — | — | — |
| N—Si-3 (Compound of Formula (3)) | *8 (mmol) | — | — | — | — | — | — | — | — |
| N—Si-4 (Compound of Formula (3)) | *9 (mmol) | — | — | — | — | — | — | — | — |
| N—Si-5 (Compound of Formula (3)) | *10 (mmol) | — | — | — | — | — | — | — | — |
| N—Si-6 (Compound of Formula (3)) | *11 (mmol) | — | — | — | — | — | — | — | — |
| N—O-1 | *12 (mmol) | — | — | — | — | — | — | — | — |
| Si—Cl-1 | *13 (mmol) | 0.45 | — | — | — | — | — | — | — |
| Sn—Cl-1 | *14 (mmol) | — | — | — | — | — | — | — | 1.12 |
| Onium Forming Agent | | | | | | | | | |
| C—OH-1 | *15 (mmol) | — | 9.03 | — | — | — | — | — | — |
| Si—Cl-1 | *13 (mmol) | — | — | 4.52 | — | — | — | — | — |

*1 N-Trimethylsilylpiperazine
*2 N-(tert-Butyldimethylsilyl)piperazine
*3 1,3-Ditrimethylsilyl-1,3,5-triazinane
*4 Piperidine
*5 N,N'Dimethyl-N'-trimethylsilyl-1,6-dimethylaminohexane
*6 N,N-Bis(trimethylsilyl)aminopropylmethyldiethoxysilane
*7 3-(4-Trimethylsilyl-1-piperazino)propyltriethoxysilane
*8 3-(4-Methyl-1-piperazino)propyltriethoxysilane
*9 N-[3-(Trimethoxysilyl)-propyl-N,N'-diethyl-N'-trimethylsilyl-ethane-1,2-diamine
*10 3-Diethylaminopropyltriethoxysilane TABLE 1-continued

*11 S-Trimethylsilylmercaptopropyltriethoxysilane
*12 Tetraglycidyl-1,3-bisaminomethylcyclohexane
*13 Silicon tetrachloride
*14 Tin tetrachloride
*15 Maleic acid

TABLE 2

|  |  | Example 1 | Example 2 | Example 3 | Example 4 | Example 5 | Example 6 | Example 7 | Example 8 | Example 9 |
|---|---|---|---|---|---|---|---|---|---|---|
|  |  | Kind of Modified Conjugated Diene Polymer | | | | | | | | |
|  |  | A | B | C | D | E | F | G | H | I |
| Styrene Unit Amount | (%) | 25 | 25 | 25 | 25 | 25 | 25 | 25 | 25 | 25 |
| Vinyl Content | (%) | 56 | 56 | 55 | 55 | 55 | 55 | 56 | 55 | 55 |
| Weight Average Molecular Weight before Modification (10,000) | | 21 | 20 | 21 | 20 | 20 | 21 | 20 | 20 | 21 |
| Mooney Viscosity (ML1 + 4, 100° C.) | | 10 | 9 | 10 | 9 | 8 | 10 | 9 | 9 | 44 |

|  |  | Example 10 | Example 11 | Example 12 | Example 13 | Example 14 | Example 15 | Comparative Example 1 | Comparative Example 2 |
|---|---|---|---|---|---|---|---|---|---|
|  |  | Kind of Modified Conjugated Diene Polymer | | | | | | | |
|  |  | J | K | L | M | N | O | P | Q |
| Styrene Unit Amount | (%) | 25 | 25 | 25 | 25 | 25 | 25 | 25 | 25 |
| Vinyl Content | (%) | 56 | 55 | 56 | 56 | 56 | 56 | 56 | 56 |
| Weight Average Molecular Weight before Modification (10,000) | | 20 | 20 | 20 | 20 | 20 | 20 | 20 | 20 |
| Mooney Viscosity (ML1 + 4, 100° C.) | | 42 | 70 | 72 | 9 | 10 | 10 | 8 | 59 |

TABLE 3

| Compounding Formula | | Parts by Mass |
|---|---|---|
| Modified Conjugated Diene Polymer | | 70 |
| Polybutadiene Rubber | *1 | 30 |
| Extender Oil | *2 | 37.5 |
| Silica | *3 | 70 |
| Carbon Black | *4 | 5.6 |
| Silane Coupling Agent | *5 | 5.6 |
| Stearic Acid | | 2 |
| Anti-Aging Agent | *6 | 1 |
| Zinc Oxide | | 3 |
| Vulcanization Accelerator D | *7 | 1.5 |
| Vulcanization Accelerator CZ | *8 | 1.8 |
| Sulfur | | 1.5 |

*1: Manufactured by JSR Corporation, BR01
*2: Manufactured by Japan Energy Corporation, JOMO Process NC-140
*3: Manufactured by Rhodia Inc., ZEOSIL 1165MP
*4: Manufactured by Mitsubishi Chemical Corporation, Dia Black N339
*5: Manufactured by Evonik Corporation, Si75
*6: Manufactured by Seiko Chemical Co., Ltd., Ozonon 6C
*7: Manufactured by Ouchi Shinko Chemical Industrial Co., Ltd., Nocceler D
*8: Manufactured by Ouchi Shinko Chemical Industrial Co., Ltd., Nocceler CZ

TABLE 4

|  |  | Characteristics of Crosslinked Polymer | | | | | | | | |
|---|---|---|---|---|---|---|---|---|---|---|
|  |  | Example 1 | Example 2 | Example 3 | Example 4 | Example 5 | Example 6 | Example 7 | Example 8 | Example 9 |
|  |  | Kind of Modified Conjugated Diene Polymer | | | | | | | | |
|  |  | A | B | C | D | E | F | G | H | I |
| Mooney Viscosity (ML1 + 4, 100° C.) | | 92 | 90 | 97 | 83 | 78 | 80 | 76 | 85 | 110 |
| 0° C. tan δ | (index) | 125 | 128 | 129 | 123 | 121 | 124 | 121 | 118 | 122 |
| 70° C. tan δ | (index) | 134 | 136 | 130 | 128 | 124 | 126 | 123 | 123 | 125 |
| Wear Resistance | (index) | 105 | 107 | 106 | 104 | 105 | 104 | 104 | 105 | 108 |

|  |  | Characteristics of Crosslinked Polymer | | | | | | | |
|---|---|---|---|---|---|---|---|---|---|
|  |  | Example 10 | Example 11 | Example 12 | Example 13 | Example 14 | Example 15 | Comparative Example 1 | Comparative Example 2 |
|  |  | Kind of Modified Conjugated Diene Polymer | | | | | | | |
|  |  | J | K | L | M | N | O | P | Q |
| Mooney Viscosity (ML1+ 4, 100° C.) | | 105 | 89 | 90 | 69 | 76 | 94 | 86 | 74 |
| 0° C. tan δ | (index) | 123 | 132 | 131 | 110 | 117 | 127 | 100 | 93 |

TABLE 4-continued

| 70° C. tan δ | (index) | 124 | 136 | 136 | 116 | 128 | 131 | 100 | 87 |
|---|---|---|---|---|---|---|---|---|---|
| Wear Resistance | (index) | 109 | 106 | 107 | 103 | 104 | 105 | 100 | 97 |

Table 4 shows that Examples 1 to 15 are excellent in low hysteresis loss characteristics (70° C. tan δ), wet skid resistance (0° C. tan δ) and wear resistance of the crosslinked polymers, compared to Comparative Examples 1 and 2.

The invention claimed is:

1. A method for producing a modified conjugated diene polymer, the method comprising:

polymerizing a monomer comprising a conjugated diene compound or a monomer comprising a conjugated diene compound and an aromatic vinyl compound in the presence of at least one compound selected from the group consisting of the following formulae (1) and (2) and an alkali metal compound or an alkaline earth metal compound, to obtain a first modified conjugated diene polymer:

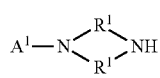

(1)

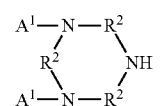

(2)

wherein, in formulae (1) and (2):
$A^1$ is independently a hydrocarbylsilyl group in which the three hydrogen atoms of a $SiH_3$ structure are each substituted by a hydrocarbyl group; and
$R^1$ and $R^2$ are independently hydrocarbylene groups.

2. The method according to claim 1, further comprising:
reacting the first modified conjugated diene polymer with a compound represented by formula (3), to obtain a second modified conjugated diene polymer having a structure represented by the following formula (6):

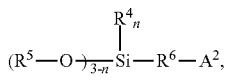

(3)

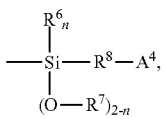

(6)

wherein, in formula (3):
$A^2$ is a functional group having at least one atom selected from the group consisting of N, P and S, having no active hydrogen and being bound to $R^6$ by any one atom of the above N, P and S, such that in a part or all of the at least one atom selected from the group consisting of the above N, P and S of $A^2$ is protected by a protecting group, wherein the protecting group is optionally a hydrocarbylsilyl group in which the three hydrogen atoms of a $SiH_3$ structure are each substituted by a hydrocarbyl group;
$R^4$ and $R^5$ are independently hydrocarbyl groups;
$R^6$ is a hydrocarbylene group; and
n is an integer of 0 to 2, and wherein, in formula (6):
$A^4$ is a functional group having at least one atom selected from the group consisting of N, P and S and being bound to $R^8$ by any one atom of the above N, P and S, such that a part or all of the at least one atom selected from the group consisting of the above N, P and S of $A^4$ is protected by a protecting group, wherein the protecting group is optionally a hydrocarbylsilyl group in which the three hydrogen atoms of a $SiH_3$ structure are each substituted by a hydrocarbyl group;
$R^6$ is independently a hydrocarbyl group;
$R^7$ is independently a hydrogen atom or a hydrocarbyl group;
n is an integer of 0 to 2; and
$R^8$ is a hydrocarbylene group.

3. The method of claim 1, wherein the first modified conjugated diene polymer is reacted with an onium-forming agent.

4. The method of claim 2, wherein the first modified conjugated diene polymer is reacted with an onium-forming agent.

5. A modified conjugated diene polymer having a structure of formula (4) or a structure of formula (5) at one end and a structure of formula (6) at the other end:

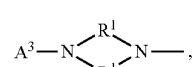

(4)

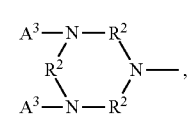

(5)

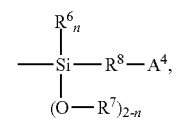

(6)

wherein, in formulae (4) and (5):
$A^3$ is independently a hydrogen atom or a hydrocarbylsilyl group; and
$R^1$ and $R^2$ are independently hydrocarbylene groups, and
wherein, in formula (6):
$A^4$ is a functional group having at least one atom selected from the group consisting of N, P and S and being bound to $R^8$ by any one atom of the above N, P and S, such that a part or all of the at least one atom selected from the group consisting of the above N, P and S of $A^4$ is protected by a protecting group, wherein the protecting group is optionally a hydrocarbylsilyl group in which the three hydrogen atoms of a $SiH_3$ structure are each substituted by a hydrocarbyl group;
$R^6$ is independently a hydrocarbyl group;
$R^7$ is independently a hydrogen atom or a hydrocarbyl group;
n is an integer of 0 to 2; and
$R^8$ is a hydrocarbylene group.

6. A polymer composition, comprising:
the modified conjugated diene polymer according to claim 5;
carbon black and/or silica; and
a crosslinking agent.

7. A crosslinked polymer obtained by crosslinking the polymer composition according to claim 6.

8. A tire, comprising the crosslinked polymer according to claim 7 as a material of a tread or a side wall.

9. A modified conjugated diene polymer having a structure of formula (4) or a structure of formula (5) at one end and a structure of formula (7) at the other end:

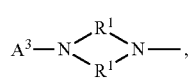
(4)

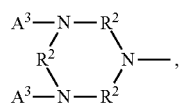
(5)

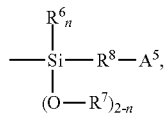
(7)

wherein, in formulae (4) and (5):
A$^3$ is independently a hydrogen atom or a hydrocarbylsilyl group; and
R$^1$ and R$^2$ are independently hydrocarbylene groups, wherein, in formula (7):
A$^5$ is a group in which a functional group having at least one atom selected from the group consisting of N, P and S and bound to R$^8$ by any one atom of the above N, P and S is converted into an onium, such that a part or all of the at least one atom selected from the group consisting of the above N, P and S of A$^5$ is protected by a protecting group, wherein the protecting group is optionally a hydrocarbylsilyl group in which the three hydrogen atoms of a SiH$_3$ structure are each substituted by a hydrocarbyl group;
R$^6$ is independently a hydrocarbyl group;
R$^7$ is independently a hydrogen atom or a hydrocarbyl group;
n is an integer of 0 to 2; and
R$^8$ is a hydrocarbylene group.

10. A polymer composition, comprising:
the modified conjugated diene polymer according to claim 9;
carbon black and/or silica; and
a crosslinking agent.

11. A crosslinked polymer obtained by crosslinking the polymer composition according to claim 10.

12. A tire, comprising the crosslinked polymer according to claim 11 as a material of a tread or a side wall.

* * * * *